(12) United States Patent
Cornelius

(10) Patent No.: US 6,390,222 B1
(45) Date of Patent: May 21, 2002

(54) THEFT PREVENTION DEVICE FOR PEDAL OPERATED VEHICLES

(76) Inventor: Christopher Cornelius, 1018 W. 109 Pl., Los Angeles, CA (US) 90044

( * ) Notice: Subject to any disclaimer, the term of this patent is extended or adjusted under 35 U.S.C. 154(b) by 0 days.

(21) Appl. No.: 09/369,292

(22) Filed: Aug. 6, 1999

(51) Int. Cl.[7] ............................................. B60R 25/00
(52) U.S. Cl. ............................ 180/287; 70/202; 70/237
(58) Field of Search ...................... 180/287; 70/202, 70/201, 237

(56) References Cited

U.S. PATENT DOCUMENTS 5,586,457 A * 12/1996 Keener ..................... 180/287
5,842,364 A * 12/1998 Oliver ........................ 70/202

* cited by examiner

Primary Examiner—Peter C. English
(74) Attorney, Agent, or Firm—Jerry H. Noh

(57) ABSTRACT

An anti-theft device for use with a pedal operated vehicle having a pedal lever. The device includes a housing member secured to the interior of a vehicle adjacent the pivotal point of the pedal lever. The housing member has a first bore housing a sliding rod. The rod moves from a retracted position to an extended position. In the extended position, the rod protrudes from the housing member for a predetermined distance and engages the pedal lever. A mechanically controlled pin engages the rod in the extended position to keep it in the extended position. With the pin engaging the rod, the rod prevents a driver from pressing down upon the pedal lever. Thus, disabling the operation of the vehicle. The normal operation of the pedal lever is restored when the pin disengages the rod, enabling the rod to freely retract into the first bore of the housing member. The movement of the rod is triggered by either air from an air compressor or by the force of a solenoid located behind the rod.

12 Claims, 3 Drawing Sheets

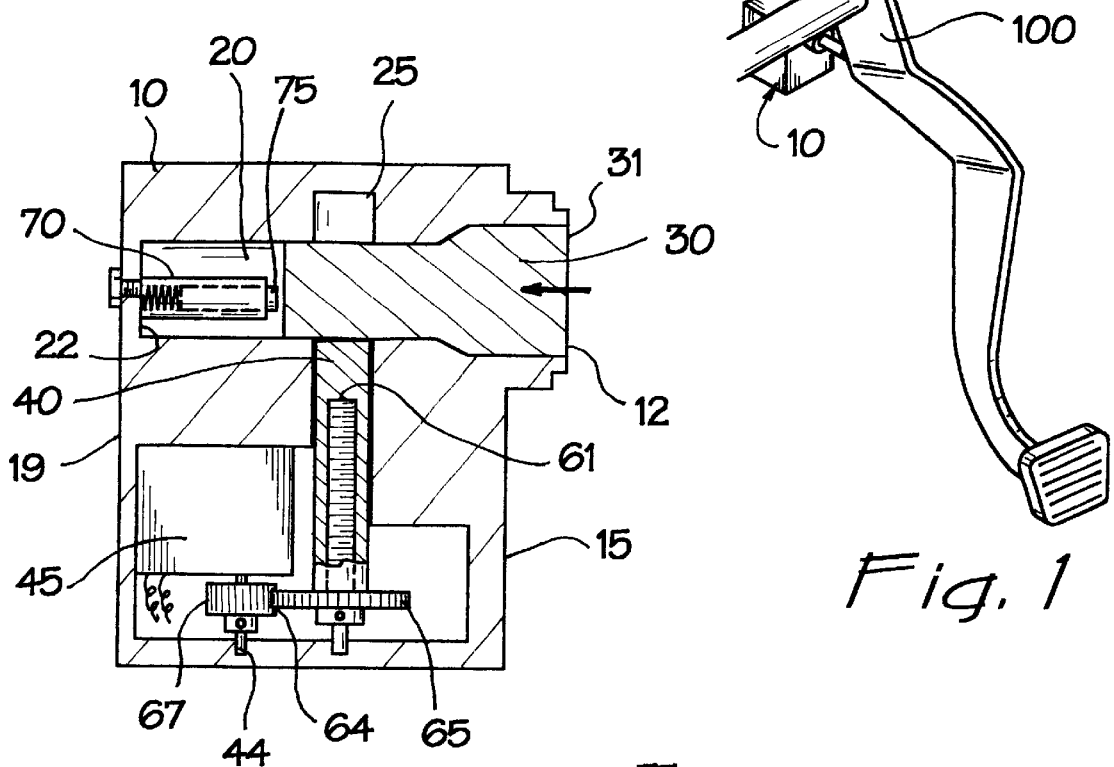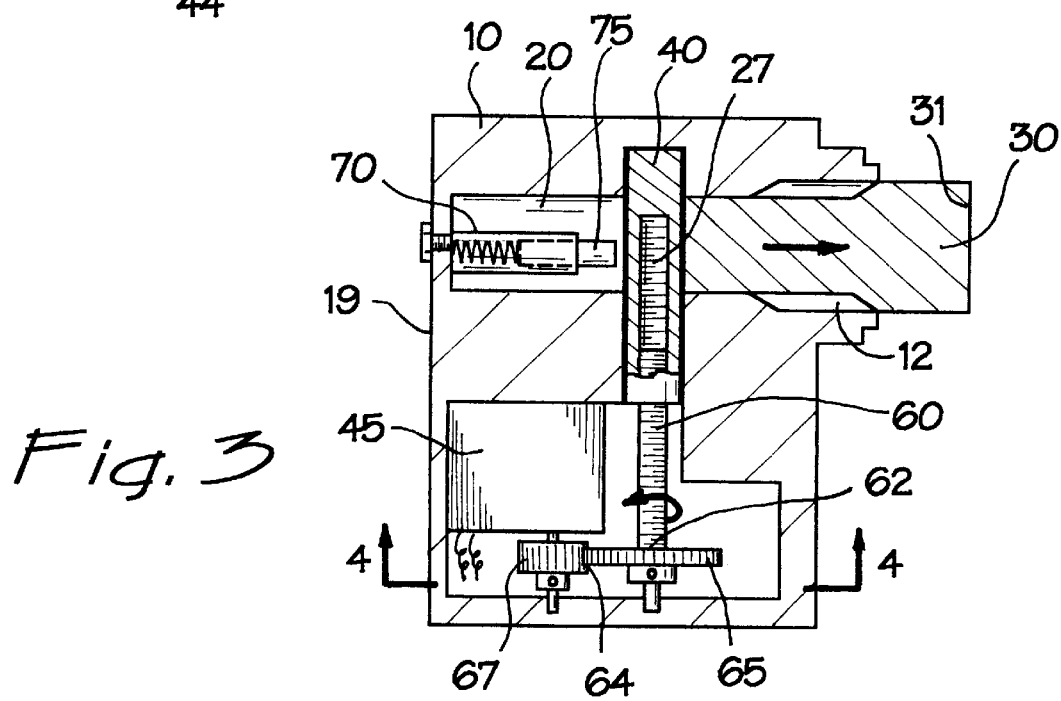

THEFT PREVENTION DEVICE FOR PEDAL OPERATED VEHICLES

BACKGROUND

1. Field of Invention

This invention relates to theft prevention devices for vehicles. More particularly, the present invention is an anti-theft device for pedal operated vehicles which operates by locking and preventing the actuation of the pedal.

2. Description of the Prior Art

Vehicle theft is a major problem in the automobile industry. There are many types of anti-theft devices for vehicles. Most cars have ignition locks and steering wheel locks as standard features. Another common anti-theft apparatus is an alarm which makes loud noises to attract attention to a vehicle being entered unlawfully. Alarms are popular options selected by most car owners, and many cars come with an alarm as a standard feature. However, it is possible to circumvent such features as indicated by the high rate of theft for cars having these common devices.

Another popular anti-theft device is an elongated rod for attachment to a steering wheel of a vehicle such as U.S. Pat. No. 5,199,283 issued to Chen commonly known as THE CLUB®, which operates by making steering impossible. Such a device can be circumvented by cutting or removing the steering wheel.

Another form of theft prevention device is a tracking device which can be concealed in an automobile. When a car is reported stolen, police can activate the tracking signal to locate the car. A disadvantage is that this device does not prevent the car from being stolen in the first place. It only serves as a deterrent to would be car thieves who fear being tracked down by police. However, car thieves who plan to quickly remove parts from a vehicle can simply steal and abandon the vehicle before police can locate them.

There are also theft prevention devices that operate by locking either the gas or brake pedal. Several prior art perform by locking the brakes through offering a means of locking up hydraulic fluid to the wheel cylinders which activate the brakes of a vehicle as exemplified by U.S. Pat. Nos. 4,040,675 and 5,431,487. Others operate by directly placing a locking mechanism around the pedals as exemplified by U.S. Pat. No. 4,493,198 issued to Brown which teaches first and second stop bodies arranged to clamp around the lever of a pedal of a vehicle to prevent actuation of the pedal. Locking mechanisms such as the one taught by Brown can be inconvenient in that a user has to manually reach down under the dashboard to the pedals of the vehicle to attach and remove the devices.

There are a substantial variety of vehicle theft prevention devices in the prior art; however, none teaches an anti-theft device like the present invention.

A primary object of the present invention is to provide a vehicle theft prevention device which is reliable.

Another object of the present invention is to provide a vehicle theft prevention device which is easy to operate.

SUMMARY OF THE INVENTION

The present invention is an anti-theft device for a pedal operated vehicle having a pedal lever. The device includes a housing member which can be adapted to be secured to an interior of a vehicle near the pedal lever. The housing member has a first bore in which a rod is positioned to move from a retracted position to an extended position. When the rod is in the extended position, it extends outwardly from the housing member for a predetermined distance and engages the pedal lever. A pin, the movement of which is controlled by an electrical motor, engages the rod in the extended position to keep it in that position, and this prevents actuation of the pedal lever. In this position, the pedal lever cannot be pressed down to operate the vehicle. The normal operation of the pedal lever is restored when the pin disengages the rod enabling the rod to freely retract into the first bore of the housing member. The movement of the rod is triggered by either air from an air compressor or by the force of a solenoid located behind the rod.

BRIEF DESCRIPTION OF THE DRAWINGS

FIG. 1 shows the device of the present invention positioned adjacent the pivotal point of a pedal lever;

FIG. 2 is a cross sectional side view of the present invention showing the rod in the retracted position;

FIG. 3 is a cross-sectional side view of the present invention showing the rod in the extended position;

DETAILED DESCRIPTION OF THE PREFERRED EMBODIMENT

Figure 2A:
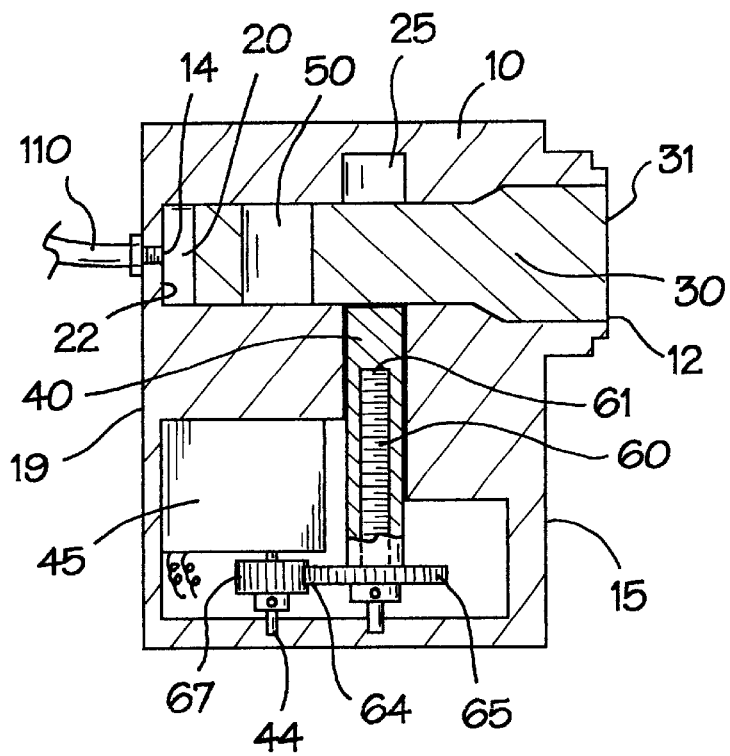
FIG. 2a is a cross sectional side view of an embodiment of the present invention having a compressed air tube positioned behind the retracted rod.
Figure 3A:
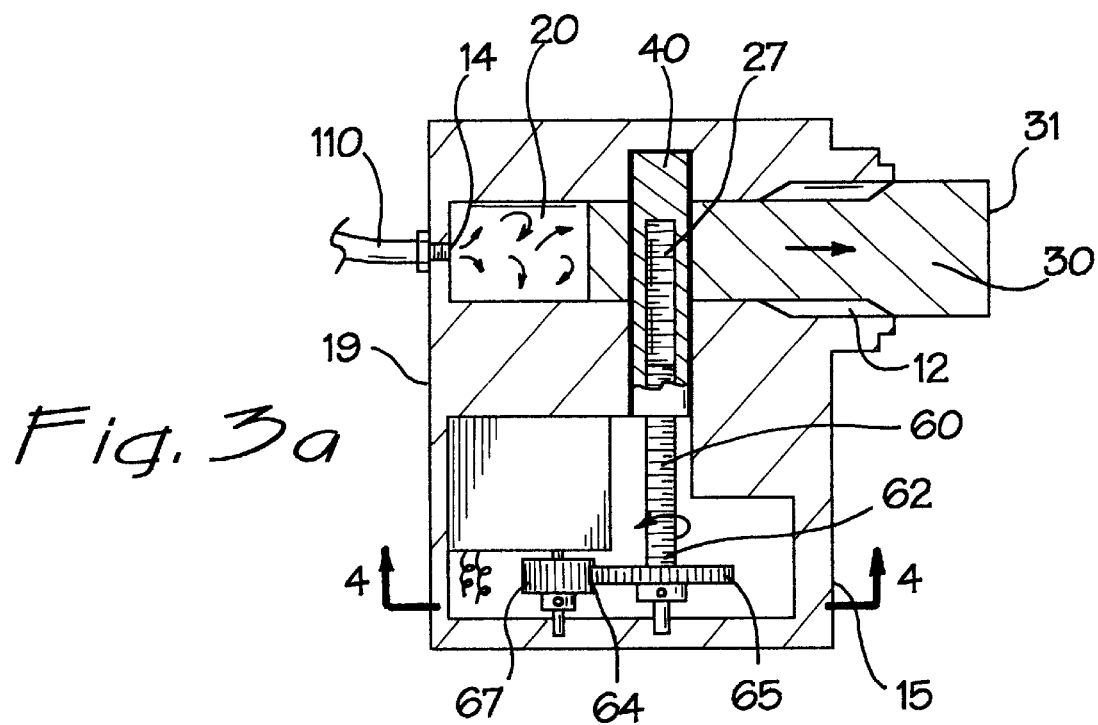
FIG. 3a is a cross-sectional side view of an embodiment of the present invention having a compressed air tube positioned behind the extended rod.
Figure 4:
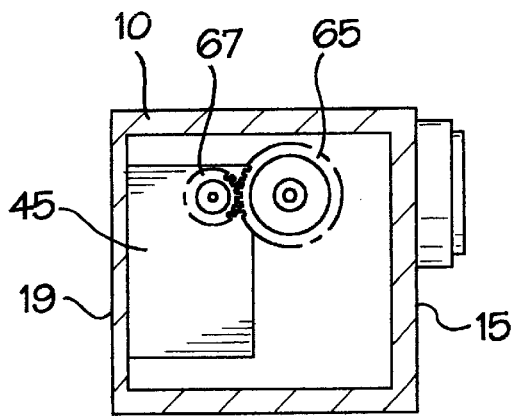
FIG. 4 is a cross-sectional top view of the present invention.

The present invention is an anti-theft device for pedal operated vehicles. The preferred embodiment of the present invention is shown in FIGS. 1–4. The device includes a housing member 10 having a front wall 15 and a back wall 19. The housing member 10 is made of a rigid durable material and has an opening 12 at the front wall 15 leading into a first bore 20 which extends longitudinally to the back wall 19. Situated within the first bore 20 is a rod 30 which is sized and shaped to fit slidably within the first bore 20. The rod 30 has a first end 31 and is movable within the first bore 20 in a piston-like manner from a retracted position as shown in FIG. 2 and FIG. 2a to an extended position as shown in FIG. 3 and FIG. 3a. In the retracted position the rod 30 remains within the first bore 20, and in the extended position the rod 30 extends outwardly from the housing member 10 for a predetermined length.

The rod 30 can be locked in the extended position by a pin 40 located within a second bore 25 of the housing member. The second bore 25 crosses the first bore 20 allowing the pin 40 to enter and exit the first bore 20. The pin 40 is movable within the second bore 25 relative to the position of the rod 30 so that when the rod 30 is in the extended armed position, the pin 40 engages the rod 30 to prevent retraction thereof. In the preferred embodiment a third bore 50 extends across the rod 30. The third bore 50 is located so that when the rod 30 is in the extended position, the third bore 50 aligns with the second bore 25 allowing the pin 40 to enter into the third bore 50.

The movement of the pin 40 is mechanically controlled by an electric motor 45 having a motor shaft 44. The pin 40 has a threaded hollow bore 27. A shaft 60 having a front end 61 and a base end 62 is threaded to mate with the threaded bore 27 of the pin 40, and thus, allowing the shaft 60 to move laterally along the bore 27 of the pin 40. The shaft 60 is connected at its base end 62 to a gear assembly 64. The gear assembly 64 includes a first gear 65 connected to a second gear 67. The second gear 67 has a smaller diameter than the first gear 65. The second gear 67 is attached to the motor shaft 44. The electrical motor 45 can be powered by a battery of a vehicle. FIGS. 2, 2a, 3, and 3a show that the pin 40 moves laterally toward the first gear 65 as the shaft 60 rotates in one direction, and that the pin 40 moves laterally away from the first gear 65 as the shaft 60 rotates in a second direction opposite the first direction.

When used with an automobile, the housing member 10 is secured on the automobile adjacent the back end of the pedal lever 100 beneath the pivotal point 105. At this location, in most cars, the housing member 10 is hidden within a fire wall and not visible in the floor area. The housing member 10 is positioned with the front wall 15 facing the pedal lever 100 so that when the rod 30 is in the extended position, the first end 31 of the rod 30 engages the pedal lever 100 to limit actuation of the pedal lever 100. As shown in FIG. 3a, the movement of the rod 30 from the retracted position to the extended position is triggered by air pressure supplied by an air compressor source. Many automobiles have an air compressor source as a standard feature. For those cars having an air compressor, a tube 110 is connected at one end to the air compressor, and the other end is connected to a hole 14 located at the back wall 19 of the housing member 10. The hole 14 leads into the first bore 20. For those cars not equipped with an air compressor, one would need to be installed. As an alternative shown in FIG. 2 and FIG. 3, the movement of the rod 30 could be controlled by a solenoid 70 positioned within the first bore 20 behind the rod 30 and attached to a base 22 of the first bore 20. The solenoid 70 has a protruding pin 75, which upon activation, quickly extends and retracts. The activation of the solenoid 70 causes the solenoid pin 75 to push against the rod 30 to move the rod 30 from the retracted position to the extended position.

The operation of the anti-theft device can be controlled by a key switch. When the vehicle is being operated, the anti-theft device is inactivated. In the inactive state, the rod 30 is retracted allowing the driver to freely press down on the pedal lever 100. When the driver parks the vehicle and wants to activate the device (to render the vehicle theft-proof), a key is inserted into the key switch and turned to the "on" position. Turning the switch to the "on" position triggers the air compressor to release air into the first bore 20 causing the rod 30 to eject to the extended position. Should the device have a solenoid 70 instead of an air compressor, the turning of the switch to the "on" position activates the solenoid 70. The key switch also activates the electrical motor 45 immediately after the rod 30 reaches the extended position. Upon activation, the electrical motor 45 rotates the shaft 60 in the direction which moves the pin 40 laterally away from the gear assembly 64 and into the third bore 50 of the extended rod 30 (FIG. 3a) or behind the extended rod 30 (FIG. 3). When the driver wants to operate the vehicle, the key switch is turned to the "off" slot. Upon rotating the key switch to the "off" position, the electrical motor 45 rotates in the direction which moves the pin 40 laterally toward the gear assembly 64 and out of the third bore 50 (FIG. 2a) or out from behind the rod 30 (FIG. 2). As the driver presses down upon the pedal lever 100, the rod 30 will be pushed back into the retracted position. In the alternative, the electrical motor 45 can be activated and deactivated independently by a second key switch or a key remote device.

Figure 5:
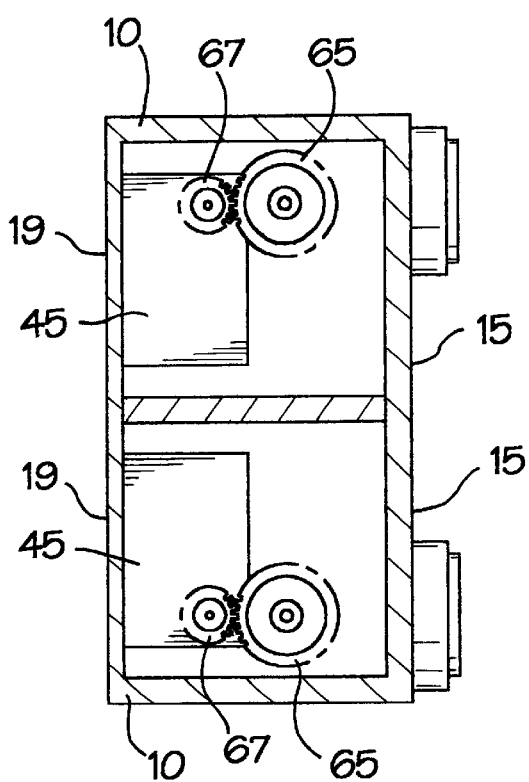
FIG. 5 is a cross-sectional top view of a second embodiment of the present invention having dual rods.
Figure 6:
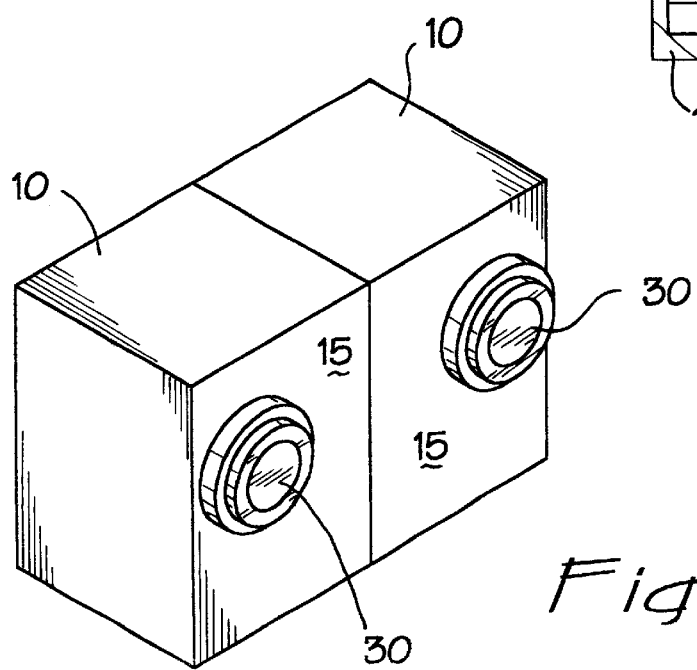
FIG. 6 is a perspective view of the second embodiment of the present invention.

For vehicles having a brake pedal and a gas pedal, the device could be installed behind the pedal lever of each of the brake and gas pedal. In the alternative a second embodiment of the device shown in FIGS. 5 and 6 has a second fixedly attached housing member 10. The second embodiment has two rods 30, and the device can be positioned in the vehicle so that upon activation, one rod 30 engages the brake pedal and the other rod 30 engages the gas pedal.

What is claimed is:

1. An anti-theft device for a pedal operated vehicle having a pedal lever, said device comprising:

a housing member secured to an interior of said vehicle adjacent said pedal lever, said housing member having a front wall and a back wall;

an opening disposed on said front wall of said housing member leading to a first bore, said first bore extending longitudinally to said back wall;

a hole disposed on said back wall of said housing member leading into said first bore;

a rod, said rod having a first end and being movable within said first bore of said housing member from a retracted position to an extended position;

whereby, when said rod is in said retracted position said rod remains within said first bore of said housing member, and when said rod is in said extended position said rod extends outwardly from said housing member for a predetermined distance and engages said pedal lever to limit actuation of said pedal lever; and a means to move said rod from said retracted to said extended position.

2. An anti-theft device as described in claim 1 further comprising a means to lock said rod in said extended position.

3. The anti-theft device as described in claim 2 in which the means to lock said rod in said extended position comprises:

an electrical motor having a motor shaft disposed within said housing member;

a second bore disposed within said housing member, said second bore intersecting said first bore;

a pin slideably disposed within said second bore, said pin having a threaded bore;

a shaft having a front end and a base, said shaft being threaded to mate with the threading along the bore of said pin;

said base being fixedly connected to a gear assembly, said gear assembly being fixedly connected to said motor shaft;

said motor rotating in a first direction causing said shaft to move into the bore of the pin causing said pin to slide toward said gear assembly;

said motor rotating in a second direction opposite to said first direction causing said shaft to move out of said bore of said pin and causing said pin to slide away from said gear assembly; and, said pin being movable relative to the position of the rod so that when the rod is in the extended position, the pin engages the rod to prevent retraction thereof.

4. The anti-theft device as described in claim 2 in which the means to lock said rod in said extended position comprises:

an electrical motor having a motor shaft disposed within said housing member;

a second bore disposed within said housing member, said second bore intersecting said first bore;

a pin slideably disposed within said second bore, said pin having a threaded bore;

a third bore extending across said rod parallel to said second bore so that when said rod is in said extended position said third bore is in alignment with said second bore;

a shaft having a front end and a base, said shaft being threaded to mate with the threading along the bore of said pin;

said base being fixedly connected to a gear assembly, said gear assembly being fixedly connected to said motor shaft;

said motor rotating in a first direction causing said shaft to move into the bore of the pin causing said pin to slide toward said gear assembly;

said motor rotating in a second direction opposite to said first direction causing said shaft to move out of said bore of said pin and causing said pin to slide away from said gear assembly; and, said pin being movable relative to the position of the rod so that when the rod is in the extended position, the pin slides into the third bore of the rod to prevent retraction thereof.

5. The anti-theft device as described in claim 1 wherein said means to move said rod from said retracted to said extended position is a solenoid disposed within said first bore between said rod and said back wall;

said solenoid comprising:
a protruding solenoid pin, said solenoid pin extending and retracting from within said solenoid upon activation; and whereby the extension of the solenoid pin urges the rod from the retracted position to the extended position.

6. The anti-theft device as described in claim 1 wherein said means to move said rod from said retracted to said extended position comprises:

an air compression pump, a tube connecting said air compression pump to said hole disposed on said back wall of said housing member; and whereby air from the pump can be pumped into said first bore via said hole to move said rod from said retracted position to said extended position by air pressure.

7. An anti-theft device for a pedal operated vehicle having two pedal levers, said device comprising:

a first housing member;

a second housing member fixedly attached to said first housing member;

said first and second housing members secured to an interior of said vehicle adjacent to said pedal levers, each of said first and second housing members comprising:

a front wall;

a back wall opposite said front wall;

an opening disposed on said front wall of said housing member leading to a first bore, said first bore extending longitudinally to said back wall;

a hole disposed on said back wall of said housing member leading into said first bore;

a rod, said rod having a first end and being movable within said first bore of said housing member from a retracted position to an extended position; whereby, when said rod is in said retracted position said rod remains within said first bore of said housing member, and when said rod is in said extended position said rod extends outwardly from said housing member for a predetermined distance and engages a corresponding pedal lever to limit actuation of said pedal lever; and a means to move said rod from said retracted to said extended position.

8. An anti-theft device as described in claim 7 with each housing member further comprising a means to lock said rod in said extended position.

9. The anti-theft device as described in claim 8 in which the means to lock said rod in said extended position comprises:

an electrical motor having a motor shaft disposed within said housing member;

a second bore disposed within said housing member, said second bore intersecting said first bore;

a pin slideably disposed within said second bore, said pin having a threaded bore;

a shaft having a front end and a base, said shaft being threaded to mate with the threading along the bore of said pin;

said base being fixedly connected to a gear assembly, said gear assembly being fixedly connected to said motor shaft;

said motor rotating in a first direction causing said shaft to move into the bore of the pin causing said pin to slide toward said gear assembly;

said motor rotating in a second direction opposite to said first direction causing said shaft to move out of said bore of said pin and causing said pin to slide away from said gear assembly; and, said pin being movable relative to the position of the rod so that when the rod is in the extended position, the pin engages the rod to prevent retraction thereof.

10. The anti-theft device as described in claim 8 in which the means to lock said rod in said extended position comprises:

an electrical motor having a motor shaft disposed within said housing member;

a second bore disposed within said housing member, said second bore intersecting said first bore;

a pin slideably disposed within said second bore, said pin having a threaded bore;

a third bore extending across said rod parallel to said second bore so that when said rod is in said extended position said third bore is in alignment with said second bore;

a shaft having a front end and a base, said shaft being threaded to mate with the threading along the bore of said pin;

said base being fixedly connected to a gear assembly, said gear assembly being fixedly connected to said motor shaft;

said motor rotating in a first direction causing said shaft to move into the bore of the pin causing said pin to slide toward said gear assembly;

said motor rotating in a second direction opposite to said first direction causing said shaft to move out of said bore of said pin and causing said pin to slide away from said gear assembly; and, said pin being movable relative to the position of the rod so that when the rod is in the extended position, the pin slides into the third bore of the rod to prevent retraction thereof.

11. The anti-theft device as described in claim 7 wherein said means to move said rod from said retracted to said extended position of each housing member is a solenoid disposed within said first bore between said rod and said back wall;

said solenoid comprising:
a protruding solenoid pin, said solenoid pin extending and retracting from within said solenoid upon activation; and whereby the extension of the solenoid pin urges the rod from the retracted position to the extended position.

12. The anti-theft device as described in claim 7 wherein said means to move said rod from said retracted to said extended position of each housing member comprises:

an air compression pump, a tube connecting said air compression pump to said hole disposed on said back wall of said housing member; and whereby, air from the pump can be pumped into said first bore via said hole to move said rod from said retracted position to said extended position by air pressure.

* * * * *